(12) United States Patent
Hopkins et al.

(10) Patent No.: US 11,251,475 B2
(45) Date of Patent: Feb. 15, 2022

(54) CORROSION MITIGATION IN METAL-AIR BATTERIES

(71) Applicant: Massachusetts Institute of Technology, Cambridge, MA (US)

(72) Inventors: Brandon James Hopkins, Cambridge, MA (US); Douglas P. Hart, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 464 days.

(21) Appl. No.: 16/091,897

(22) PCT Filed: Mar. 1, 2017

(86) PCT No.: PCT/US2017/020093
§ 371 (c)(1),
(2) Date: Oct. 5, 2018

(87) PCT Pub. No.: WO2017/176390
PCT Pub. Date: Oct. 12, 2017

(65) Prior Publication Data
US 2019/0123407 A1    Apr. 25, 2019

Related U.S. Application Data

(60) Provisional application No. 62/318,816, filed on Apr. 6, 2016, provisional application No. 62/394,309, filed on Sep. 14, 2016.

(51) Int. Cl.
*H01M 12/02*   (2006.01)
*H01M 10/0525*   (2010.01)
(Continued)

(52) U.S. Cl.
CPC .............. *H01M 12/02* (2013.01); *H01M 4/38* (2013.01); *H01M 10/0525* (2013.01);
(Continued)

(58) Field of Classification Search
None
See application file for complete search history.

(56) References Cited

U.S. PATENT DOCUMENTS 4,548,878 A * 10/1985 Gordon ................. H01M 12/06
429/101
4,916,036 A   4/1990 Cheiky
(Continued)

FOREIGN PATENT DOCUMENTS

WO   WO-2013150520   10/2013
WO   WO-2017176390   10/2017

OTHER PUBLICATIONS

EPO, "Application Serial No. PCT/US17/20093, Invitation to Pay Additional Fees and Partial Int'l Search dated May 12, 2017", 14 pages.
(Continued)

*Primary Examiner* — Alix E Eggerding
(74) *Attorney, Agent, or Firm* — Strategic Patents, P.C.

(57) ABSTRACT

Corrosion mitigation in a metal-air battery includes displacing an electrolyte within a gap of the metal-air battery with a liquid. The liquid may be substantially nonreactive with the electrolyte, and the anode of the metal-air battery is less reactive with the liquid than with the electrolyte. Upon displacement of the electrolyte from the gap, the liquid may remain in the gap of the metal-air battery to reduce the likelihood of corrosion of the anode and, therefore, reduce the power drain of the battery resulting from such corrosion. To return the metal-air battery to an activated state for generating power, the electrolyte may be moved back into the gap to displace the liquid. A fluid circuit may be in fluid communication with the gap and may displace one of the liquid and the electrolyte in the gap with the other one of the liquid and the electrolyte from the fluid circuit.

17 Claims, 5 Drawing Sheets

(51) Int. Cl.
  *H01M 12/06* (2006.01)
  *H01M 4/38* (2006.01)
  *H01M 50/77* (2021.01)
  *H01M 10/46* (2006.01)
  *H01M 12/08* (2006.01)
  *H01M 10/052* (2010.01)
  *H01M 4/46* (2006.01)

(52) U.S. Cl.
  CPC .......... *H01M 10/46* (2013.01); *H01M 12/06* (2013.01); *H01M 12/08* (2013.01); *H01M 50/77* (2021.01); *H01M 4/463* (2013.01); *H01M 10/052* (2013.01); *H01M 2220/20* (2013.01); *H01M 2250/20* (2013.01); *H01M 2300/0014* (2013.01); *Y02E 60/10* (2013.01); *Y02T 10/70* (2013.01); *Y02T 90/40* (2013.01)

(56) References Cited

U.S. PATENT DOCUMENTS

| | | |
|---|---|---|
| 2012/0041624 A1 | 2/2012 | Stewart et al. |
| 2013/0285597 A1 | 10/2013 | Goldstein |
| 2013/0306565 A1 | 11/2013 | Davis |
| 2015/0171494 A1* | 6/2015 | Tzidon ................ H01M 12/065 429/406 |
| 2017/0222288 A1* | 8/2017 | Ashfield ............. H01M 4/8626 |
| 2019/0326603 A1 | 10/2019 | Hopkins et al. |

OTHER PUBLICATIONS

WIPO, "PCT Application No. PCT/US17/20093 International Preliminary Report on Patentability dated Oct. 18, 2018", 12 pages.
EPO, "PCT Application No. PCT/US17/20093 International Search Report and Written Opinion dated Jul. 4, 2017", 18 pages.
USPTO, "U.S. Appl. No. 16/393,645 Non-Final Office Action dated Aug. 2, 2021", 9 pages.

* cited by examiner

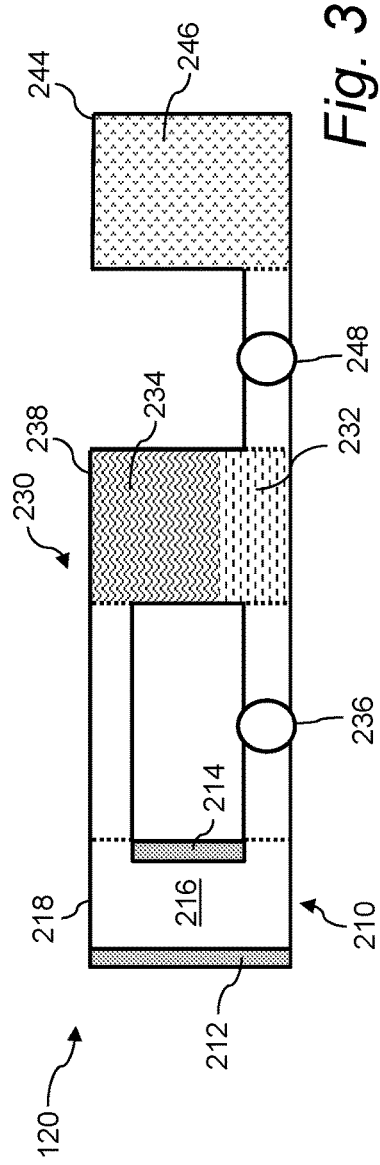
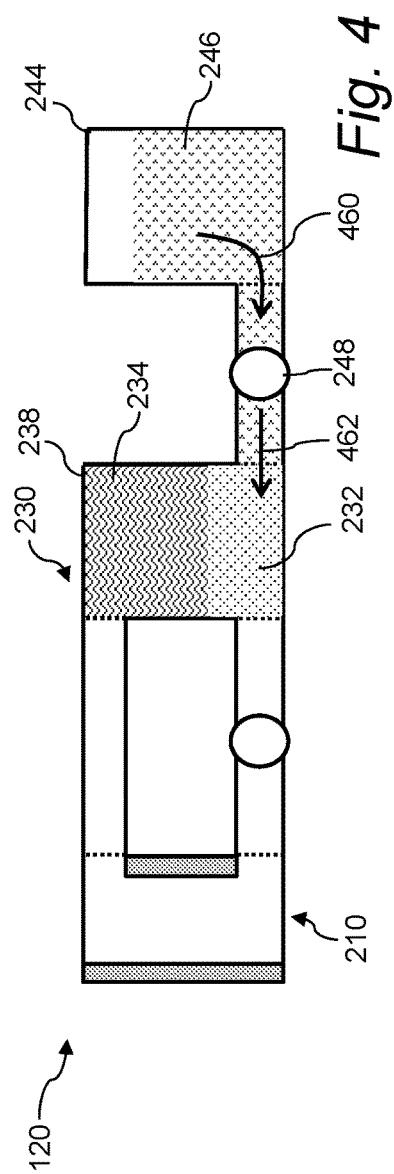
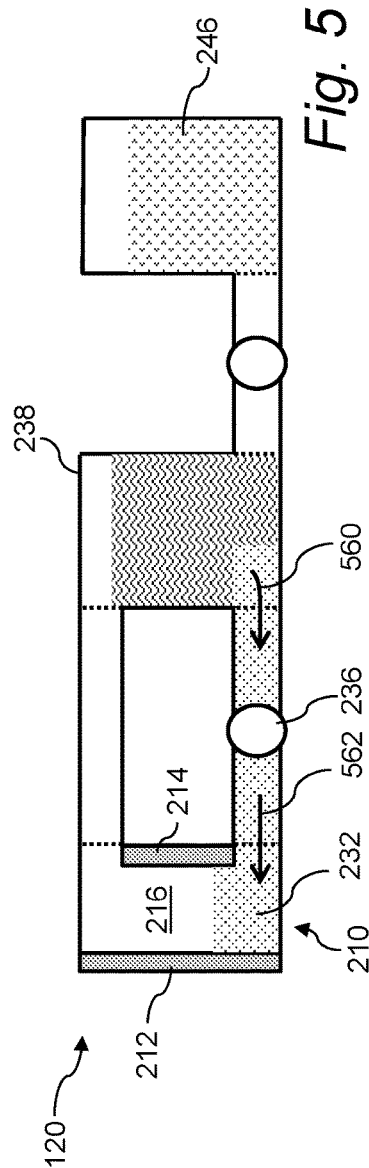

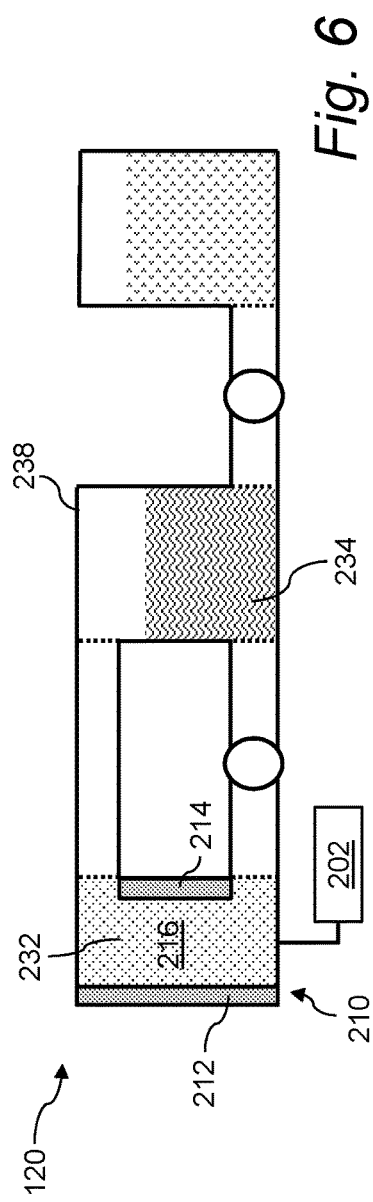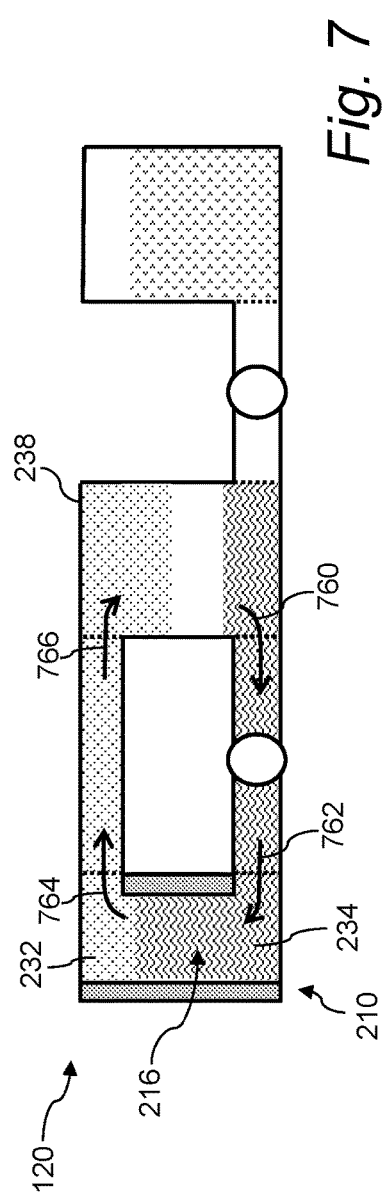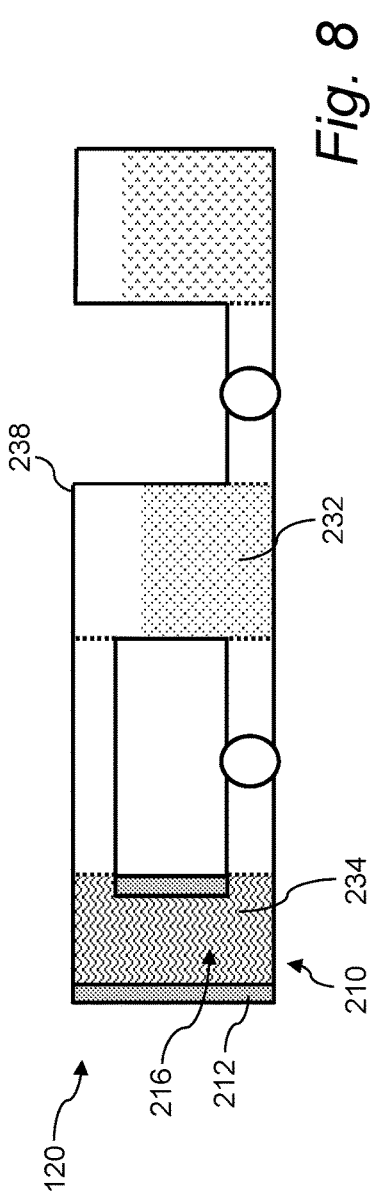

CORROSION MITIGATION IN METAL-AIR BATTERIES

CROSS-REFERENCE TO RELATED APPLICATIONS

This application is a national stage entry application of International Patent Application No. PCT/US17/20093, filed on Mar. 1, 2017, which claims priority to and the benefit of U.S. Provisional Application No. 62/318,816, filed on Apr. 6, 2016, and U.S. Provisional Application No. 62/394,309, filed on Sep. 14, 2016, with the entire contents of each of the foregoing hereby incorporated herein by reference.

GOVERNMENT LICENSE RIGHTS

This invention was made with government support under Contract No. FA8721-05-C-0002 awarded by the United States Air Force. The government has certain rights in the invention.

TECHNICAL FIELD

The disclosure generally relates to corrosion mitigation in metal-air batteries.

BACKGROUND

Metal-air batteries, such as aluminum-air (Al-air) batteries, may be well-suited for use in battery electric vehicles (BEVs) due to advantageous characteristics such as having a relatively high pack-level gravimetric energy density compared to other batteries (e.g., greater than about 450 watt-hours per kilogram or Wh kg$^{-1}$), and because of the relative abundance, recyclability, low weight, and low cost of metals that can be used in such batteries. However, many metal-air batteries are susceptible to open-circuit anode corrosion, which can cause severe capacity fade when a metal-air battery is deactivated. For example, when an electrolyte is removed from a gap disposed between a metallic anode and an air cathode of the battery, some electrolyte may remain in contact with the metallic anode and, through exposure to air, may corrode the metallic anode.

SUMMARY

Corrosion mitigation in a metal-air battery includes displacing an electrolyte within a gap of the metal-air battery with a liquid. The liquid may be substantially nonreactive with the electrolyte, and the anode of the metal-air battery is less reactive with the liquid than with the electrolyte. Upon displacement of the electrolyte from the gap, the liquid may remain in the gap of the metal-air battery to reduce the likelihood of corrosion of the anode and, therefore, reduce the power drain of the battery resulting from such corrosion. To return the metal-air battery to an activated state for generating power, the electrolyte may be moved back into the gap to displace the liquid. A fluid circuit may be in fluid communication with the gap and may displace one of the liquid and the electrolyte in the gap with the other one of the liquid and the electrolyte from the fluid circuit.

In implementations, an electrical charging system may include an electrical load and a metal-air battery in electrical communication with the electrical load. The metal-air battery may include a metallic anode and an air cathode spaced apart from the metallic anode, where a space between the metallic anode and the air cathode defines a gap. The metal-air battery may also include a fluid circuit in fluid communication with the gap, the fluid circuit including a pump, a flowable form of an electrolyte, and a liquid, where the liquid is substantially nonreactive with the flowable form of the electrolyte, and the metallic anode is less reactive with the liquid than with the flowable form of the electrolyte. The metal-air battery may further include a switch operable to control electrical and ionic communication of the metallic anode with the air cathode between an activated state and a deactivated state, where the pump is actuatable to displace one of the liquid and the flowable form of the electrolyte in the gap with the other one of the liquid and the flowable form of the electrolyte as the switch is moved between the activated state and the deactivated state.

Implementations may include one or more of the following features. The electrical load may include a battery rechargeable by the metal-air battery with the metallic anode and the air cathode in electrical communication in the activated state. The system may further include a vehicle, where the rechargeable battery is a lithium-ion battery electrically coupled to a drive-train of the vehicle.

In implementations, a system may include a metallic anode, an air cathode spaced apart from the metallic anode such that the air cathode and the metallic anode define a gap therebetween, and a fluid circuit in fluid communication with the gap. The fluid circuit may include a flowable form of an electrolyte and a liquid, where the liquid is substantially nonreactive with the flowable form of the electrolyte, the metallic anode is less reactive with the liquid than with the flowable form of the electrolyte, and the liquid is movable in the fluid circuit to displace the flowable form of the electrolyte in the fluid circuit.

Implementations may include one or more of the following features. The fluid circuit may include a pump actuatable to displace one of the liquid and a flowable form of the electrolyte in the gap with the other one of the liquid and the flowable form of the electrolyte from the fluid circuit. The fluid circuit and the gap may define a substantially closed system as the liquid and the flowable form of the electrolyte are displaced back and forth in the gap. The system may further include a housing containing the metallic anode and the air cathode, where the gap between the metallic anode and the air cathode is disposed within the housing. The housing may include a membrane permeable to hydrogen gas and substantially impermeable to the liquid and the flowable form of the electrolyte. The fluid circuit may include a first reservoir that holds one of the liquid and the flowable form of the electrolyte while the other one of the liquid and the flowable form of the electrolyte is disposed in the gap. The first reservoir may include a membrane permeable to hydrogen gas and substantially impermeable to the liquid and the flowable form of the electrolyte. The system may further include a second reservoir including a carrier, where the second reservoir is in fluid communication with the first reservoir such that the carrier is movable from the second reservoir to the first reservoir for mixing with the flowable form of the electrolyte. The mixture of the carrier and the flowable form of the electrolyte may have a greater flowability than the flowable form of the electrolyte alone. The carrier may include water, and the mixture of the carrier and the flowable form of the electrolyte may be an aqueous solution of the flowable form of the electrolyte. The carrier may include a gel. The system may further include a second pump disposed between the first reservoir and the second reservoir, where the second pump is actuatable to supply the carrier from the second reservoir to the first reservoir. The second reservoir may include a membrane permeable to air and substantially impermeable to the carrier. The flowable form of the electrolyte may include an aqueous solution of the electrolyte. The flowable form of the electrolyte may include a gel containing the electrolyte. The flowable form of the electrolyte may include a powder. The liquid may be less conductive than the electrolyte. The liquid may include an oil. The liquid may include one or more of a mineral oil and a silicone oil. The liquid may be substantially inviscid. The liquid may have a different density than the electrolyte at room temperature. The metallic anode may include aluminum. The flowable form of the electrolyte may include crystallized electrolytes. The system may further include one or more crystallizers that maintain a predetermined conductivity of the flowable form of the electrolyte. The electrolyte may include one or more of sodium hydroxide and potassium hydroxide. The system may further include a lithium-ion battery, where the metallic anode, the air cathode, and the electrolyte form a metal-air battery, and where the metal-air battery is electrically coupled to the lithium-ion battery for charging the lithium-ion battery using electrical power generated by the metal-air battery.

In implementations, a method of operating a metal-air battery may include supplying a flowable form of an electrolyte from a fluid circuit to a gap defined between a metallic anode and an air cathode of the metal-air battery, and, with the flowable form of the electrolyte disposed in the gap between the metallic anode and the air cathode, generating electrical power at the metal-air battery. The method may also include selectively moving a liquid from the fluid circuit into the gap, the movement of the liquid into the gap displacing the flowable form of the electrolyte from the gap to the fluid circuit and substantially limiting a reactant of a reaction occurring at the metallic anode in the presence of the flowable form of the electrolyte.

Implementations may include one or more of the following features. The metallic anode may be less reactive with the liquid than with the flowable form of the electrolyte. The liquid may be substantially immiscible with the flowable form of the electrolyte. The method may further include selectively moving the flowable form of the electrolyte into the gap, where movement of the flowable form of the electrolyte into the gap displaces the liquid from the gap to the fluid circuit. The method may further include maintaining the flowable form of the electrolyte in the gap to generate electrical power from the metal-air battery when the metal-air battery is in an activated state. The method may further include maintaining the liquid in the gap when the metal-air battery is in a deactivated state. The method may further include actuating a pump in fluid communication with the fluid circuit and the gap to selectively move the liquid from the fluid circuit into the gap. The method may further include actuating a pump in fluid communication with the fluid circuit and the gap to selectively move the flowable form of the electrolyte from the fluid circuit to the gap. The method may further include moving the displaced flowable form of the electrolyte from the gap into a first reservoir, where the fluid circuit includes the first reservoir. The method may further include selectively moving the flowable form of the electrolyte from the first reservoir into the gap, the movement of the flowable form of the electrolyte into the gap displacing the liquid from the gap to the first reservoir. The method may further include actuating a pump in fluid communication with the first reservoir and the gap to selectively move one of the liquid and the flowable form of the electrolyte from the first reservoir into the gap to displace the other one of the liquid and the flowable form of the electrolyte in the gap, the other one of the liquid and the flowable form of the electrolyte received by the first reservoir upon displacement. The method may further include supplying water to the fluid circuit such that the flowable form of the electrolyte includes an aqueous solution of the electrolyte. The water may be supplied from a second reservoir in fluid communication with a first reservoir including the flowable form of the electrolyte. The liquid may be less conductive than the flowable form of the electrolyte. The liquid may include a liquid oil. The liquid oil may include one or more of mineral oil and a silicone oil. The metallic anode may include aluminum. The flowable form of the electrolyte may include one or more of sodium hydroxide and potassium hydroxide. The method may further include providing electrical power generated at the metal-air battery to a lithium-ion battery for charging the lithium-ion battery. The flowable form of the electrolyte may include an aqueous solution of the electrolyte. The flowable form of the electrolyte may include a gel including the electrolyte. The flowable form of the electrolyte may include a powder.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals may identify corresponding elements.

FIG. 3 is a schematic representation of the metal-air battery system of FIG. 1 in a first state of operation.

FIG. 4 is a schematic representation of the metal-air battery system of FIG. 1 in a second state of operation.

FIG. 5 is a schematic representation of the metal-air battery system of FIG. 1 in a third state of operation.

FIG. 6 is a schematic representation of the metal-air battery system of FIG. 1 in a fourth state of operation.

FIG. 7 is a schematic representation of the metal-air battery system of FIG. 1 in a fifth state of operation.

FIG. 8 is a schematic representation of the metal-air battery system of FIG. 1 in a sixth state of operation.

DETAILED DESCRIPTION

Figure 1:
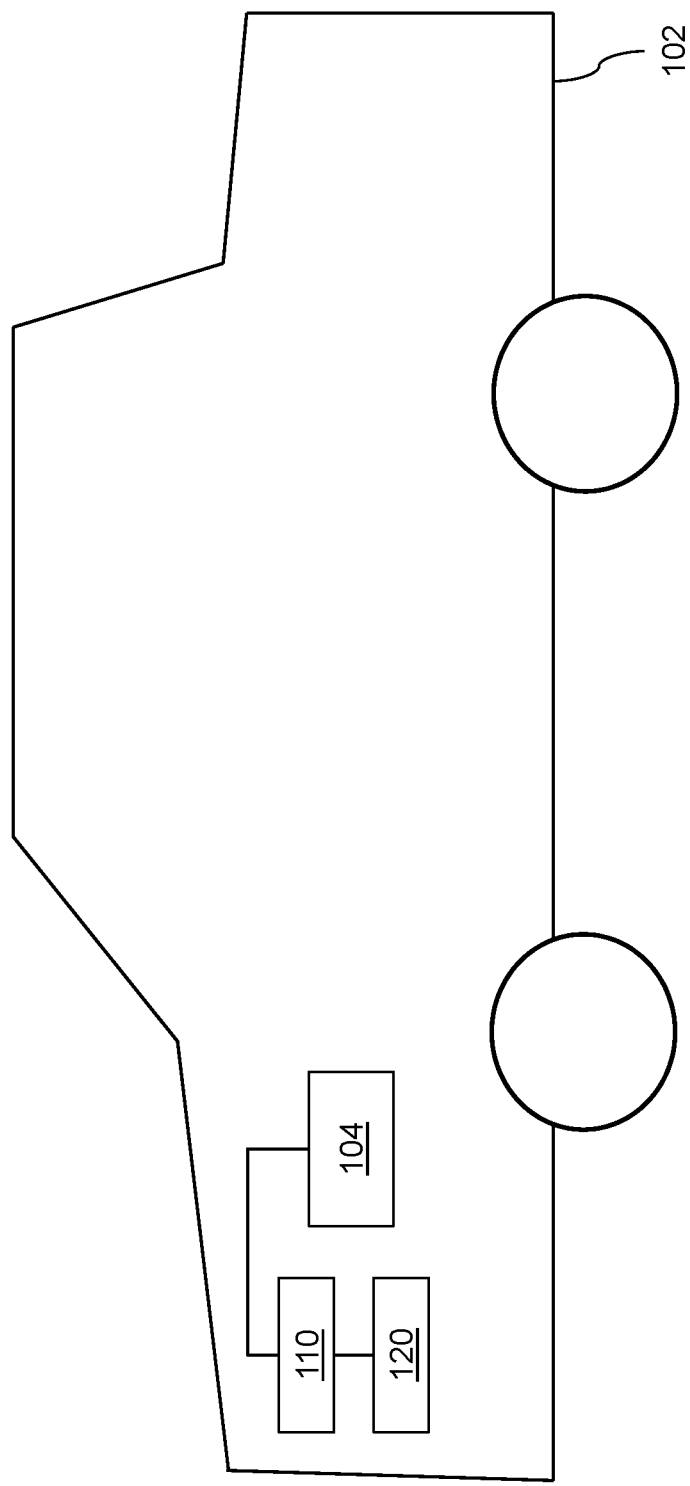
FIG. 1 is a schematic representation of a battery electric vehicle (BEV) including a metal-air battery system.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended to better describe the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms, unless specifically stated.

In general, described herein are devices, systems, and methods for mitigating corrosion in metal-air batteries. It will be understood, however, that the devices, systems, methods, and techniques described herein may also, or instead, be used for, or may otherwise be adapted for use with, other batteries, such as metal-seawater batteries, or generally other electrochemical devices that are susceptible to corrosion. Further, although the description may emphasize mitigating corrosion in aluminum-air (Al-air) batteries, it will be understood that the devices, systems, and methods of the present disclosure may include other metal-air batteries including, without limitation, zinc-air (Zn-air) batteries. For the sake of clarity of explanation, the devices, systems, and methods described herein are generally described in the context of batteries included in a battery electric vehicle. It should be appreciated, however, that the devices, systems, and methods of the present disclosure are generally applicable to batteries in any of various different applications, unless otherwise specified or made clear from the context. By way of example, and not limitation, the devices, systems, and methods of the present disclosure are generally applicable to batteries in power tools, portable electronic devices, generators, portable power systems, spacecraft, electrical appliances, and combinations thereof.

FIG. 1 is a schematic representation of a battery electric vehicle (BEV). In FIG. 1, a BEV 102 may include a motor 104, a rechargeable battery 110, and a metal-air battery system 120. The motor 104, the rechargeable battery 110, and the metal-air battery system 120 may be electrically coupled to one another. The rechargeable battery 110 may include, for example, a lithium-ion (Li-ion) battery, or another electrically rechargeable battery, e.g., connected as a primary power source for the motor 104 of the BEV 102. The metal-air battery system 120 may include a metal-air battery that can charge the rechargeable battery 110 when the electrical production capability of the rechargeable battery 110 reaches a certain threshold amount or otherwise becomes depleted. In this manner, when the BEV 102 is away from a stationary power source for recharging the rechargeable battery 110, the metal-air battery system 120 on board the BEV 102 may act as a range extender that charges the rechargeable battery 110, thus facilitating travel beyond the range of the rechargeable battery 110 alone, which can mitigate range anxiety associated with battery-electric vehicles (BEVs).

Because the metal-air battery system 120 may be used relatively infrequently (e.g., when the rechargeable battery 110 is beyond a depletion threshold and a stationary power source is not available), the metal-air battery system 120 may include a metal-air battery that can be stored for relatively long periods of time between uses and can be mechanically recharged during regular maintenance procedures such as an oil change or tire change of the BEV 102. More specifically, as described in greater detail below, the metal-air battery system 120 may include a liquid and an electrolyte movable in a fluid circuit to displace one another in contact with a metal anode of a metal-air battery to reduce the likelihood of corrosion of the metal anode between uses, e.g., over the course of multiple charging cycles of the rechargeable battery 110. Such a reduction of the likelihood of corrosion of the metal anode can reduce performance degradation of the metal-air battery of the metal-air battery system 120, as compared to metal-air batteries in which a metal anode is stored in air between uses.

In general, the BEV 102 may include a terrestrial vehicle, an aerial vehicle, an aquatic vehicle, or combinations thereof. More specifically, the BEV 102 may include an automobile, an airplane, or a boat. Additionally, or alternatively, the BEV 102 may include a manned or an unmanned vehicle (e.g., a drone).

One or more of the rechargeable battery 110 and the metal-air battery system 120 may provide power to other components of the BEV 102, e.g., in combination with, or instead of, providing power to the motor 104. For example, one or more of the rechargeable battery 110 and the metal-air battery 120 may provide power to non-propulsion related devices of the BEV 102 such as auxiliary electronic components, e.g., a radio, an entertainment system, a light, an auxiliary motor such as for a window or a door, a heating system, a cooling system, and combinations thereof. Also, although two batteries are shown in FIG. 1, in certain implementations, the BEV 102 may include only a single battery (e.g., a metal-air battery of the metal-air battery system 120), or the BEV 102 may include more than two batteries.

The metal-air battery system 120 may include, for example, an Al-air battery. As compared to other types of batteries, the Al-air battery may be useful as a secondary battery in the BEV 102 at least because the Al-air battery has a relatively high pack-level gravimetric energy density. For example, some commercially available Al-air battery packs, such as those designed for military applications, can reach energy densities up to about 467 watt-hours per kilogram (Wh kg$^{-1}$). Aluminum is also relatively abundant, recyclable, lightweight, and inexpensive.

In general, a discharge reaction for an Al-air battery under closed-circuit conditions may proceed as described in Eqs. 1 and 2 below.

$$O_2 + 2H_2O + 4e^- \rightarrow 4OH \quad \text{(Eq. 1)}$$

$$Al + 4OH \rightarrow Al(OH)_4 + 3e \quad \text{(Eq. 2)}$$

As shown in Eq. 1, oxygen from outside an Al-air battery may enter the battery (e.g., a casing or housing of the battery) through an air cathode (e.g., an air-breathing cathode) where the oxygen reacts with water and electrons to create hydroxides. These hydroxides may then travel through an aqueous electrolyte solution, such as a sodium hydroxide (NaOH) electrolyte solution or a potassium hydroxide (KOH) electrolyte solution, until the hydroxides reach an aluminum anode of the Al-air battery. At the anode, the hydroxides may react with the aluminum yielding a waste product, aluminate, and electrons that can perform useful work as outlined in Eq. 2.

During both discharge and deactivated conditions in which water remains in contact with the aluminum anode, a parasitic reaction referred to as "corrosion" may consume the aluminum anode, robbing the Al-air battery of aluminum that otherwise could produce electricity according to the reactions in Eq. 1 and Eq. 2. An example of a corrosion reaction is described below in Eq. 3.

$$2Al + 6H_2O \rightarrow 2Al(OH)_3 + 3H_2 \quad (Eq. 3)$$

As shown in Eq. 3, ionically conductive water in the electrolyte, which provides for the transport of hydroxides, may react with aluminum to form a waste product, aluminum trihydroxide, and hydrogen gas. As described in greater detail below, the devices, systems, and methods of the present disclosure may reduce the likelihood of corrosion occurring through the reaction in Eq. 3, or analogous corrosion reactions (e.g., in other types of metal-air batteries), by interrupting contact between the metal anode and water during a deactivated (open-circuit) condition in which the metal-air battery is between uses. Thus, as also described in greater detail below, the devices, systems, and methods of the present disclosure can reduce open-circuit corrosion, and the associated rapid capacity fade, as compared to exposing the metal anode to air in between uses.

In general, corrosion mitigation devices, systems, and methods of the present disclosure may include displacing a flowable form of an electrolyte within a gap of a metal-air battery with a liquid that is substantially non-reactive with an electrolyte. The metal anode may have less reactivity with the liquid than with the flowable form of the electrolyte. It should be understood that such displacement of the flowable form of the electrolyte from the gap may take place when the metal-air battery is in a deactivated stated, e.g., prior to an initial use or between uses. The liquid may remain in the gap of the metal-air battery to reduce the likelihood of corrosion of the metallic anode and, thus, may reduce a power drain of the metal-air battery, as compared to leaving the metallic anode exposed to the electrolyte and/or air, when the battery is in a deactivated state (e.g., a state coinciding with an open circuit condition of the metal-air battery in which electricity production of the metal-air battery is interrupted). To place the metal-air battery in an activated state (e.g., a state coinciding with a closed-circuit condition in which electricity can be produced in the metal-air battery), the flowable form of the electrolyte may be moved into the gap to displace the liquid for generating electrical power. Thus, it should be appreciated that the liquid and the flowable form of the electrolyte can displace one another in the gap of the metal-air battery to facilitate intermittent operation of the metal-air battery over the course of a prolonged period with a reduced degradation in performance, as compared to leaving an electrolyte in contact with a metal anode or leaving the metal anode exposed to air between uses.

Figure 2:
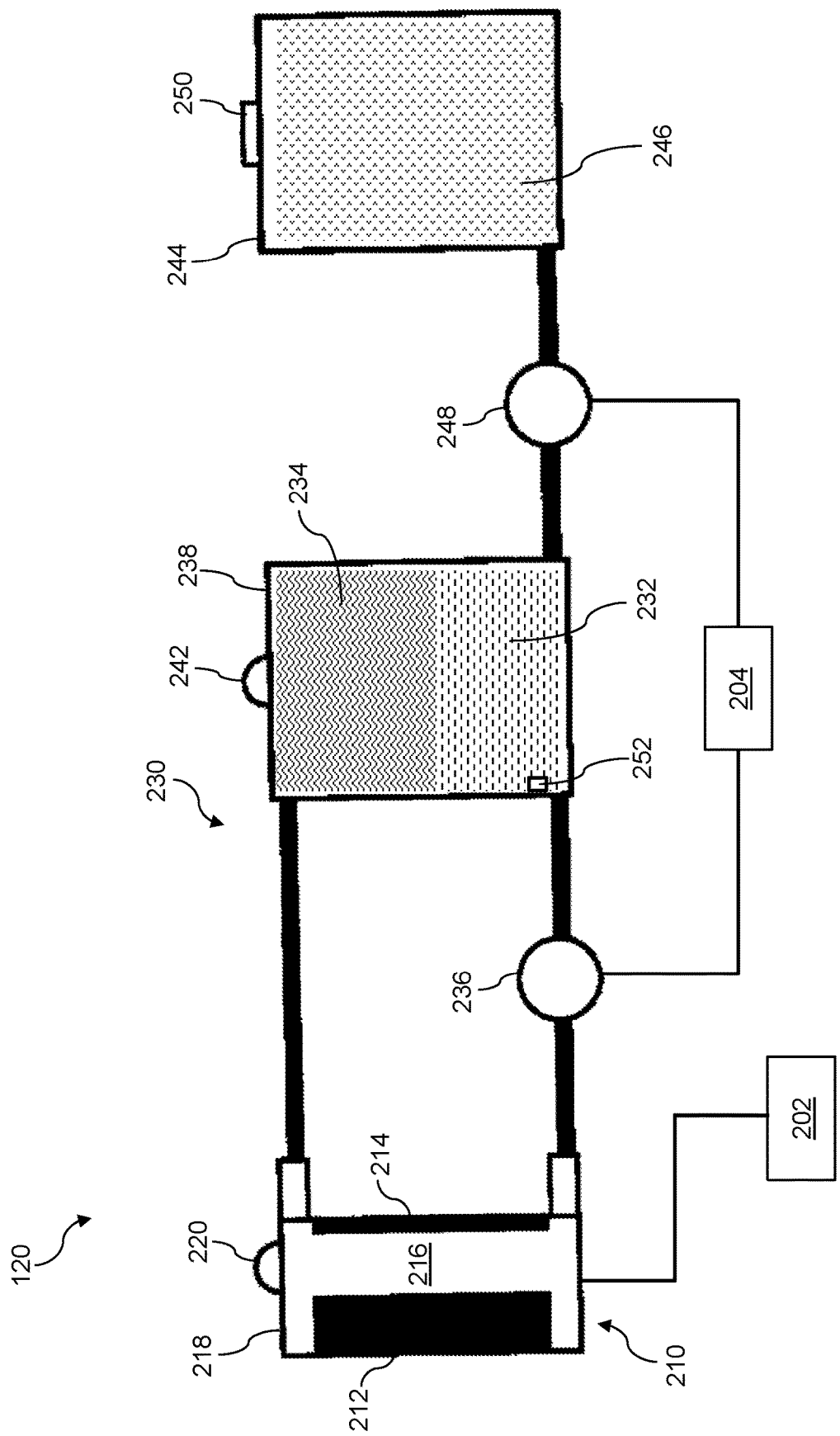
FIG. 2 is a schematic representation of the metal-air battery system of FIG. 1.

FIG. 2 is a schematic representation of the metal-air battery system 120. As described in greater detail below, the metal-air battery system 120 may mitigate corrosion and capacity fade in a metal-air battery 210 by limiting exposure of portions of the metal-air battery 210 to an electrolyte, air, or both between uses.

The metal-air battery system 120 may include a fluid circuit 230 in fluid communication with the metal-air battery 210. The fluid circuit 230 may include a liquid 234 and a flowable form of an electrolyte 232. In use, the liquid 234 may be movable from the fluid circuit 230 to displace the flowable form of the electrolyte 232 present in the metal-air battery 210 when the metal-air battery 210 switches from an activated state to a deactivated state. Additionally, or alternatively, the flowable form of the electrolyte 232 may be movable from the fluid circuit 230 to displace the fluid 234 present in the metal-air battery 120 when the metal-air battery 120 switches from the deactivated state to the activated state.

The metal-air battery 210 may include a metallic anode 212 and an air cathode 214 spaced apart from the metallic anode 212, such that the air cathode 214 and the metallic anode 212 define a gap 216 within the metal-air battery 210. The metal-air battery 210 may further, or instead, include a housing 218 disposed about at least a portion of the metallic anode 212, the air cathode 214, and the gap 216.

The metallic anode 212 may include any of various different materials suitable for generating electricity upon exposure to the flowable form of the electrolyte 232. For the sake of clarity of explanation, the metallic anode 212 may be described herein as being formed of aluminum such that the metal-air battery 210 is an Al-air battery that can, in certain implementations, produce electricity according to Eq. 1 and Eq. 2 above. Unless otherwise specified or made clear from the context, however, it should be appreciated that the metallic anode 212 may further, or instead, include any one or more other materials, including materials participating in primary reactions on the surface of the metallic anode 212 and ancillary materials present, for example, for supporting the metallic anode 212. Examples of other materials include zinc, germanium, calcium, iron, lithium, magnesium, potassium, sodium, silicon, tin, and combinations thereof. In certain implementations, the metallic anode 212 includes pure metal. In some implementations, the metallic anode 212 includes an alloy of a metal. The metallic anode 212 may be wholly disposed within the housing 218, where the metallic anode 212 is generally protected from an external environment.

The air cathode 214 may allow air or another oxygen containing fluid, substance, or solution into the gap 216 of the metal-air battery 210 for reacting with the flowable form of the electrolyte 232. The combination of oxygen and the flowable form of the electrolyte 232 may react with the metallic anode 212 to produce electricity (e.g., as indicated in Eq. 1 and 2 with respect to the reaction with aluminum). It should be appreciated that, in certain implementations, a seawater-breathing cathode may be used in addition to, or instead of, the air cathode 214 without departing from the scope of the present disclosure.

In certain implementations, the air cathode 214 may include a reactive layer of carbon having one or more of a nickel-grid current collector, a catalyst (e.g., cobalt), and a porous hydrophobic polytetrafluoroethylene (PTFE) film that may prevent leakage of the electrolyte 232. Continuing with this example, oxygen in the air of the external environment may pass through the PTFE of the air cathode 214, such that the oxygen reacts with water in an aqueous solution of the electrolyte 232 to create hydroxide ions. The hydroxide ions may react with the metallic anode 212 (e.g., according to Eqs. 1 and 2 above) to yield a waste product (e.g., aluminate) and electrons that can perform useful work. To facilitate the passage of air through the air cathode 214 from the external environment, the air cathode 214 may be partially disposed within the housing 218. To facilitate escape of a waste product or other gases from the gap 216 of the metal-air battery 210, the housing 218 may include a first membrane 220 permeable to hydrogen gas and substantially impermeable to the liquid 234 and the flowable form of the electrolyte 232. While the first membrane 220 is described as being a single membrane, it should be appreciated that the first membrane 220 may include a plurality of membranes.

One or more of the metallic anode 212 and the air cathode 214 may be substantially hydrophilic. For example, the metallic anode 212 may be naturally hydrophilic. Additionally, or alternatively, the air cathode 214 may be configured to be hydrophilic. In certain implementations in which the flowable form of the electrolyte 232 includes an aqueous solution, the hydrophilicity of the metallic anode 212 and the air cathode 214 can facilitate displacing the liquid 234 from the surface of the metallic anode 212 and the air cathode 214 such that the liquid 234 does not foul the surface of, or otherwise degrade performance of, the metallic anode 212 or the air cathode 214.

The fluid circuit 230 may be in fluid communication with the metal-air battery 210, and more specifically, with the gap 216 of the metal-air battery 210. The fluid circuit 230 may generally include one or more of piping, reservoirs, pumps, and combinations thereof, such that the flowable form of the electrolyte 232 and the liquid 234 are movable between the fluid circuit 230 and the gap 216. For example, the flowable form of the electrolyte 232 and the liquid 234 can displace one another from each of the fluid circuit 230 and the gap 216 when being moved between the fluid circuit 230 and the gap 216. Further, or instead, the fluid circuit 230 and the gap 216 may define a substantially closed system as different substances (e.g., the liquid 234 and a flowable form of the electrolyte 232) are displaced back and forth in the gap 216. It will be understood that a "substantially closed system" in this context includes a completely closed system (e.g., a hermetically sealed system), as well as partially closed systems in which the liquid 234 and the flowable form of the electrolyte 232 are sealed within the system, but air, hydrogen, or other fluids may enter or leave the system.

It will be understood that the flowable form of the electrolyte 232 may include one or more movable forms of the electrolyte. For example, the flowable form of the electrolyte 232 may include the electrolyte in a liquid state, a substantially liquid state (e.g., a gel), a gaseous state, a powder, a solid state, and combinations thereof. More generally, it should be understood that, as used herein, the flowable form of the electrolyte 232 includes any form of electrolyte that can be made to flow through the fluid circuit 230 through the exertion of force and/or through the addition of a fluid, a gel, or other similar carrier. In certain implementations, water or another carrier can be added to the fluid circuit 230 such that the flowable form of the electrolyte 232 can flow into the gap 216 of the metal-air battery 210 to begin production of electricity in an activated state of the metal-air battery 210. In certain instances, the metal-air battery system 120 may include one or more crystallizers 252 that maintain a predetermined conductivity of the flowable form of the electrolyte 232.

The flowable form of the electrolyte 232 may include one or more of an aqueous solution of the electrolyte, a gel containing the electrolyte, a powder, crystallized electrolytes, and combinations thereof.

The flowable form of the electrolyte 232 may be reactive with the metallic anode 212 as described herein, and conductive between the metallic anode 212 and the air cathode 214 as described herein. The flowable form of the electrolyte 232 may include, for example, one or more of sodium hydroxide and potassium hydroxide. The flowable form of the electrolyte 232 may also, or instead, include one or more of a polymer, an alcohol, an organic substance, an inorganic substance, an ionic substance, and combinations thereof.

The liquid 234 may be substantially nonreactive with the flowable form of the electrolyte 232, such that the flowable form of the electrolyte 232 is less reactive with the liquid 234 than with the metallic anode 212. The liquid 234 being substantially nonreactive with the flowable form of the electrolyte 232 may also, or instead, include that a majority of the total mass both of the liquid 234 and the flowable form of the electrolyte 232 do not react with one another under normal operating conditions of the metal-air battery 210 (e.g., normal operating temperatures and pressures) for certain predetermined time periods (e.g., a predicted life of the metal-air battery 210, a predicted time span between services of the metal-air battery 210 or an electrical load 202, or a certain number of uses of the metal-air battery 210). In this manner, the liquid 234 and the flowable form of the electrolyte 232 can be in the fluid circuit 230 without causing adverse chemical reactions within the metal-air battery system 120. For example, both the liquid 234 and the flowable form of the electrolyte 232 may be included simultaneously in a single reservoir of the fluid circuit 230, prior to an initial activation of the metal-air battery 120. Additionally, or alternatively, the liquid 234 and the flowable form of the electrolyte 232 may displace one another within one or more of the gap 216 and the fluid circuit 230 without causing adverse chemical reactions within the metal-air battery system 120 (or limiting such reactions).

Additionally, or alternatively, the metallic anode 212 may be less reactive with the liquid 234 than the metallic anode 212 is with the flowable form of the electrolyte 232. In this manner, when the liquid 234 is disposed in the gap 216, fewer chemical reactions may occur between the metallic anode 212 and the liquid 234 as compared to when the flowable form of the electrolyte 232 is disposed in the gap 216. Limiting these reactions may assist in mitigating corrosion of the metallic anode 212.

The liquid 234 may also, or instead, be less conductive than the flowable form of the electrolyte 232. In such instances, when the liquid 234 is disposed in the gap 216, fewer ions travel between the air cathode 214 and the metallic anode 212 as compared to when the flowable form of the electrolyte 232 is disposed in the gap 216. Limiting such conductivity may assist in mitigating corrosion of the metallic anode 212 or capacity fade of the metal-air battery 210.

The liquid 234 may also, or instead, be substantially immiscible with the flowable form of the electrolyte 232. In certain implementations, a majority of the total mass both of the liquid 234 and the flowable form of the electrolyte 232 does not mix with one another under normal operating conditions of the metal-air battery 210 (e.g., normal operating temperatures and pressures) for certain predetermined time periods (e.g., a predicted life of the metal-air battery 210, a predicted time span between services of the metal-air battery 210 or the electrical load 202, or a certain number of uses of the metal-air battery 210). In this manner, the liquid 234 and the flowable form of the electrolyte 232 may be in the fluid circuit 230 without mixing, or with limited mixing. For example, both the liquid 234 and the flowable form of the electrolyte 232 may be included in a single reservoir of the fluid circuit 230 prior to an initial activation of the metal-air battery 210, where the liquid 234 and the flowable form of the electrolyte 232 remain substantially separate. Additionally, or alternatively, the liquid 234 and the flowable form of the electrolyte 232 may displace one another within one or more of the gap 216 and the fluid circuit 230 without mixing with one another, or with limited mixing.

The liquid 234 may also, or instead, have a different density than the flowable form of the electrolyte 232 at room temperature or at another temperature (or at other environmental conditions, e.g., pressure) suitable for operation of the metal-air battery 210. The liquid 234 having a different density than the flowable form of the electrolyte 232, which may facilitate placement of one or more of the liquid 234 and the flowable form of the electrolyte 232 in a predetermined location in the fluid circuit 230 (e.g., prior to an initial activation of the metal-air battery 210). By way of example, the liquid 234 and the flowable form of the electrolyte 232 may be substantially immiscible with respect to one another, and include different densities, where the liquid 234 and the flowable form of the electrolyte 232 are each located in the same reservoir prior to an initial activation of the metal-air battery 120. The properties of the liquid 234 and the flowable form of the electrolyte 232 may allow for the flowable form of the electrolyte 232 to be disposed in a location of such a reservoir that is separated from the liquid 234 such that the flowable form of the electrolyte 232 can travel into the gap 216 upon an initial activation of the metal-air battery 210.

The liquid 234 may also, or instead, be substantially inviscid to promote ease of movement of the liquid 234 in the fluid circuit 230.

In certain implementations, the liquid 234 may include an oil. By way of example, the liquid 234 may include one or more of a mineral oil and a silicone oil. Such oils may be advantageous, for example, in the metal-air battery system 120 in which the flowable form of the electrolyte 232 is an aqueous solution, where the oil and the aqueous solution are substantially immiscible, the oil is less conductive than the aqueous solution, and the oil is less reactive with the metallic anode 212 than the flowable form of the electrolyte 232. The liquid 234 may also, or instead, include other oil-like fluids to displace the flowable form of the electrolyte 232 in the metal-air battery system 120.

The liquid 234 may be movable in the fluid circuit 230 to displace the flowable form of the electrolyte 232 in the fluid circuit 230. Similarly, the flowable form of the electrolyte 232 may be movable in the fluid circuit 230 to displace the liquid 234 in the fluid circuit 230.

As stated above, the fluid circuit 230 may include one or more of piping, reservoirs, pumps, and combinations thereof. For example, the fluid circuit 230 may include a first pump 236. The first pump 236 may be actuatable to displace one of the liquid 234 and the flowable form of the electrolyte 232 in the gap 216 with the other one of the liquid 234 and the flowable form of the electrolyte 232 from the fluid circuit 230. For example, the first pump 236 may be actuatable to displace the flowable form of the electrolyte 232 in the gap 216 with the liquid 234 from the fluid circuit 230, where the flowable form of the electrolyte 232 moves into the fluid circuit 230 from the gap 216 upon displacement by the liquid 234. Similarly, the first pump 236 may be actuatable to displace liquid 234 in the gap 216 with the flowable form of the electrolyte 232 from the fluid circuit 230, where the liquid 234 moves into the fluid circuit 230 from the gap 216 upon displacement of the liquid 234 by the flowable form of the electrolyte 232.

Because the first pump 236 may be actuatable to displace liquid 234 in the gap 216 with a flowable form of the electrolyte 232 from the fluid circuit 230, the first pump 236 may act as a switch, or may be in electrical communication with a switch or other controller 204, e.g., for controlling electrical and ionic communication of the metallic anode 212 with the air cathode 214 between an activated state and a deactivated state of the metal-air battery 210. For example, the first pump 236 may be actuatable via a controller 204 to displace one of the liquid 234 and the flowable form of the electrolyte 232 in the gap 216 with the other one of the liquid 234 and the flowable form of the electrolyte 232 as the controller 204 is moved or otherwise manipulated between an activated state and a deactivated state. In this manner, the controller 204 can be, for example, a switch, or the controller 204 may otherwise include a switch.

The fluid circuit 230 may also, or instead, include a first reservoir 238. The first reservoir 238 may hold one of the liquid 234 and the flowable form of the electrolyte 232, while the other one of the liquid 234 and the flowable form of the electrolyte 232 is disposed in the gap 216. For example, first pump 236 may be actuatable to move one of the liquid 234 and a flowable form of the electrolyte 232 from the first reservoir 238 to the gap 216 of the metal-air battery 120, or vice-versa, where movement of one of the liquid 234 and the flowable form of the electrolyte 232 from the first reservoir 238 to the gap 216 displaces the other one of the liquid 234 and the flowable form of the electrolyte 232 from the gap 216 to the first reservoir 238.

The first reservoir 238 may include a second membrane 242 permeable to hydrogen gas and substantially impermeable to the liquid 234 and the flowable form of the electrolyte 232. The second membrane 242 may allow a waste product or other gases to escape the first reservoir 238, which may facilitate movement of one or more of the liquid 234 and the flowable form of the electrolyte 232 within the fluid circuit 230.

The metal-air battery system 120 may, further or instead, include a second reservoir 244. The second reservoir 244 may be disposed, for example, in fluid communication with the first reservoir 238. The second reservoir 244 may include a carrier 246 movable from the second reservoir 244 to the fluid circuit 230, to the metal-air battery 210, or both. For example, in certain implementations, the carrier 246 may be movable from the second reservoir 244 to the first reservoir 238 for mixing with the flowable form of the electrolyte 232. The mixture of the carrier 246 and the electrolyte 232 may have a greater flowability than the flowable form of the electrolyte 232 alone. For example, the carrier 246 may increase the flowability of the flowable form of the electrolyte 232 by decreasing the viscosity of the flowable form of the electrolyte 232.

The carrier 246 may include a liquid, such as liquid water. Thus, in certain implementations, the mixture of the carrier 246 and the flowable form of the electrolyte 232 may include an aqueous solution of the electrolyte 232. For example, the flowable form of the electrolyte 232 may include a powder, and the carrier 246 may include water. Continuing with this example, the mixture of the flowable form of the electrolyte 232 and the water creates an aqueous solution containing the powder. The carrier 246 may also, or instead, include a gel.

The metal-air battery system 120 may include a second pump 248 in fluid communication with the second reservoir 244. In certain implementations, the second pump 248 is disposed between the first reservoir 238 and the second reservoir 244 and the second pump 248 may be actuatable to supply the carrier 246 from the second reservoir 244 to the first reservoir 238.

The second reservoir 244 may include a third membrane 250, which can be permeable to a gas (e.g., air) and substantially impermeable to the carrier 246. The membrane may allow for movement of the carrier 246 from the second reservoir 244 to the fluid circuit 230. One or more of the membranes in the metal-air battery system 120 may be sealable (e.g., when the metal-air battery 210 is not in use).

Referring now to FIGS. 1 and 2, the metal-air battery 120 may be in electrical communication with an electrical load 202 associated with the BEV 102. For example, the electrical load 202 may include a load associated with the rechargeable battery 110 or other electrical components of the BEV 102. For example, displacement of the liquid 234 from the gap 216 by the flowable form of the electrolyte 232 may start electrical generation in the metal-air battery 210 to recharge the rechargeable battery 110.

It will be understood that, while the metal-air battery system 120 shown in FIG. 2 shows a single metal-air battery 210, the metal-air battery system 120 may instead include a plurality of metal-air batteries 210 arranged in the form of a multi-cell battery.

FIG. 3 is a schematic representation of the metal-air battery system 120 in a first state of operation. It will be understood that the various states of operation described herein with reference to FIGS. 3-8 are provided by way of example and not of limitation. The first state of operation for the metal-air battery system 120 may be a state of operation prior to an initial activation of the metal-air battery 210.

As discussed above, the metal-air battery 210 may include a metallic anode 212, an air cathode 214, and a housing 218, where there is a space in the housing 218 between the metallic anode 212 and the air cathode 214 defining a gap 216. The metal-air battery system 120 may further include a fluid circuit 230 in fluid communication with the metal-air battery 210, and more particularly, a fluid circuit 230 in fluid communication with the gap 216 of the metal-air battery 210. The fluid circuit 230 may include a first reservoir 238 in fluid communication with the metal-air battery 210, e.g., through a piping system including one or more pipes. The fluid circuit 230 may further include a first pump 236 disposed between the metal-air battery 210 and the first reservoir 238. The metal-air battery system 120 may also include a second reservoir 244 in fluid communication with the first reservoir 238, and a second pump 248 disposed between the first reservoir 238 and the second reservoir 244.

In the first state of operation for the metal-air battery system 120, the first reservoir 238 may contain both a flowable form of the electrolyte 232 and a liquid 234. The flowable form of the electrolyte 232 may be any as described herein, e.g., including one or more of sodium hydroxide and potassium hydroxide. For example, the flowable form of the electrolyte 232 may include one or more of an aqueous solution of the electrolyte, a gel including the electrolyte, a powder, or a substantially solid mass. The liquid 234 may be any as described herein, e.g., including a liquid 234 having one or more of the following properties: (i) the liquid 234 may have less reactivity with the metal anode 212 than the flowable form of the electrolyte 232 has with the metal anode 212; (ii) the liquid 234 may be substantially immiscible with the flowable form of the electrolyte 232; and (iii) the liquid 234 may be less conductive than the flowable form of the electrolyte 232. The liquid 234 may also, or instead, have a different density than the flowable form of the electrolyte 232 under normal operating conditions of the metal-air battery 210 (e.g., normal operating temperatures and pressures). The liquid 234 may include a liquid oil, e.g., one or more of mineral oil and a silicone oil.

Because the liquid 234 may be substantially immiscible with the flowable form of the electrolyte 232, and/or have a different density than the flowable form of the electrolyte 232, the liquid 234 and the flowable form of the electrolyte 232 may be substantially separated from one another within the first reservoir 238.

In the first state of operation for the metal-air battery system 120, the second reservoir 244 may contain a carrier 246 such as any as described herein, e.g., water. Further, in the first state of operation for the metal-air battery system 120, the gap 216 of the metal-air battery 210 may be substantially empty, or may otherwise be substantially devoid of any substance or material that can cause substantial reactions with the metallic anode 212, or substantial reactions between the metallic anode 212 and the air cathode 214, where substantial reactions in this context include reactions that could significantly lessen the lifespan of the metal-air battery 210, cause a significant capacity fade, cause significant corrosion, and combinations thereof.

FIG. 4 is a schematic representation of the metal-air battery system 120 in a second state of operation. The second state of operation for the metal-air battery system 120 may include an initial activation of the metal-air battery 210, or a state in preparation of an initial activation of the metal-air battery 210.

In the second state of operation, the second pump 248 may be actuated to move the carrier 246 from the second reservoir 244 (as shown by the first arrow 460 in FIG. 4) to the first reservoir 238 (as shown by the second arrow 462 in FIG. 4) for mixing with the flowable form of the electrolyte 232. In certain aspects, the flowable form of the electrolyte 232 shown in FIG. 4 may have an increased flowability relative to the flowable form of the electrolyte 232 shown in the first state of operation in FIG. 3. For example, the flowable form of the electrolyte 232 in the first state of operation shown in FIG. 3 may include a crystallized electrolyte, and the carrier 246 may include water, such that the flowable form of the electrolyte 232 in the second state of operation shown in FIG. 4 includes an aqueous solution of the electrolyte, e.g., where at least a portion of the crystallized electrolyte is dissolved in the water or is otherwise carried by the water to form the aqueous solution of the electrolyte. In another example, the flowable form of the electrolyte 232 in the first state of operation shown in FIG. 3 may include a powder, and the carrier 246 may include a gel, such that the flowable form of the electrolyte 232 in the second state of operation shown in FIG. 4 includes a gel containing the powdered electrolyte. Thus, in general, the flowable form of the electrolyte 232 in the first state of operation shown in FIG. 3 may include a first viscosity, and the flowable form of the electrolyte 232 in the second state of operation shown in FIG. 4 may include a second viscosity, where the first viscosity is greater than the second viscosity.

In the second state of operation, the flowable form of the electrolyte 232 and the liquid 234 may be disposed within the first reservoir 238. The properties of the liquid 234 and the flowable form of the electrolyte 232 may allow for the flowable form of the electrolyte 232 to be disposed in a location of the first reservoir 238 separated from the liquid 234 such that the flowable form of the electrolyte 232 and can travel into the gap 216 upon the metal-air battery 210 being placed in an activated state, such as the state of operation shown in FIG. 5.

FIG. 5 is a schematic representation of the metal-air battery system 120 in a third state of operation. The third state of operation for the metal-air battery system 120 may be a state of operation that places the metal-air battery 210 in an activated state, where the flowable form of the electrolyte 232 is moved (e.g., pumped) from the first reservoir 238 (as shown by the first arrow 560 in FIG. 5) into the gap 216 of the metal-air battery 210 (as shown by the second arrow 562 in FIG. 5), e.g., using the first pump 236. In certain aspects, the state of operation shown in FIG. 5 represents an initial activation of the metal-air battery 210, e.g., where the flowable form of the electrolyte 232 is previously predisposed in the first reservoir 238 without any mixing with a carrier 246.

In the third state of operation, the first pump 236 may be actuated to move the flowable form of the electrolyte 232 from the first reservoir 238 into the gap 216 of the metal-air battery 210, which may be devoid of another substance prior to such actuation. Alternatively, the gap 216 may contain the liquid 234 prior to such actuation, where movement of the flowable form of the electrolyte 232 into the gap 216 displaces the liquid 234 from the gap 216 and into the first reservoir 238.

Movement of the flowable form of the electrolyte 232 into the gap 216 may cause a reaction to occur between one or more of the metallic anode 212, the air cathode 214, and the flowable form of the electrolyte 232, such that electrical power is generated by the metal-air battery 210.

FIG. 6 is a schematic representation of the metal-air battery system 120 in a fourth state of operation. The fourth state of operation for the metal-air battery system 120 may be an activated state for the metal-air battery 210, where the flowable form of the electrolyte 232 is disposed within the gap 216 of the metal-air battery 210 and the liquid 234 is disposed in the first reservoir 238. In the activated state, the flowable form of the electrolyte 232 may be maintained in the gap 216 to generate electrical power, e.g., where the air cathode 214 allows for air to enter the gap 216 to cause a reaction with a reactant that travels through the conductive flowable form of the electrolyte 232 to react with the metallic anode 212 thereby generating electrons that can perform useful work. The electrons may be transferred to an electrical load 202.

FIG. 7 is a schematic representation of the metal-air battery system 120 in a fifth state of operation. The fifth state of operation for the metal-air battery system 120 may be a state of operation that places the metal-air battery 210 in a deactivated state, where the liquid 234 is moved (e.g., pumped) from the first reservoir 238 (as shown by the first arrow 760 in FIG. 7) into the gap 216 of the metal-air battery 210 (as shown by the second arrow 762 in FIG. 7), e.g., using the first pump 736. Movement of the liquid 234 into the gap 216 may substantially displace the flowable form of the electrolyte 232 from the gap 216 (as shown by the third arrow 764 in FIG. 7). The displaced flowable form of the electrolyte 232 may travel into the first reservoir 238 (as shown by the fourth arrow 766 in FIG. 7), e.g., taking the place of the liquid 234 that once occupied the first reservoir 238. The substantial displacement of the flowable form of the electrolyte 232 from the gap 216 may substantially limit a reactant of a reaction that occurs in the gap 216 in the presence of a higher volume of the flowable form of the electrolyte 232.

FIG. 8 is a schematic representation of the metal-air battery system 120 in a sixth state of operation. The sixth state of operation for the metal-air battery system 120 may include a deactivated state for the metal-air battery 210, where the liquid 234 is disposed within the gap 216 of the metal-air battery 210 and the flowable form of the electrolyte 232 is disposed in the first reservoir 238. In the deactivated state, the liquid 234 may be maintained in the gap 216 to substantially retard one or more of reactions occurring in the metal-air battery 210, the generation of electrical power by the metal-air battery 210, the corrosion of the metallic anode 212 or another component of the metal-air battery 210, and a capacity fade of the metal-air battery 210.

Although shown as separate states of operation, it will be understood that one or more of the states of operation described with reference to FIGS. 3-8 may be combined, supplemented, or omitted. For example, an initial state of operation for the metal-air battery may include a state where the liquid 234 is disposed in the gap 216 and the flowable form of the electrolyte 232 is disposed in the first reservoir 238 (e.g., as shown in FIG. 8). By way of another example, the second reservoir 244 may be eliminated from the metal-air battery system 120. Other states of operation are also, or instead, possible.

Figure 9:
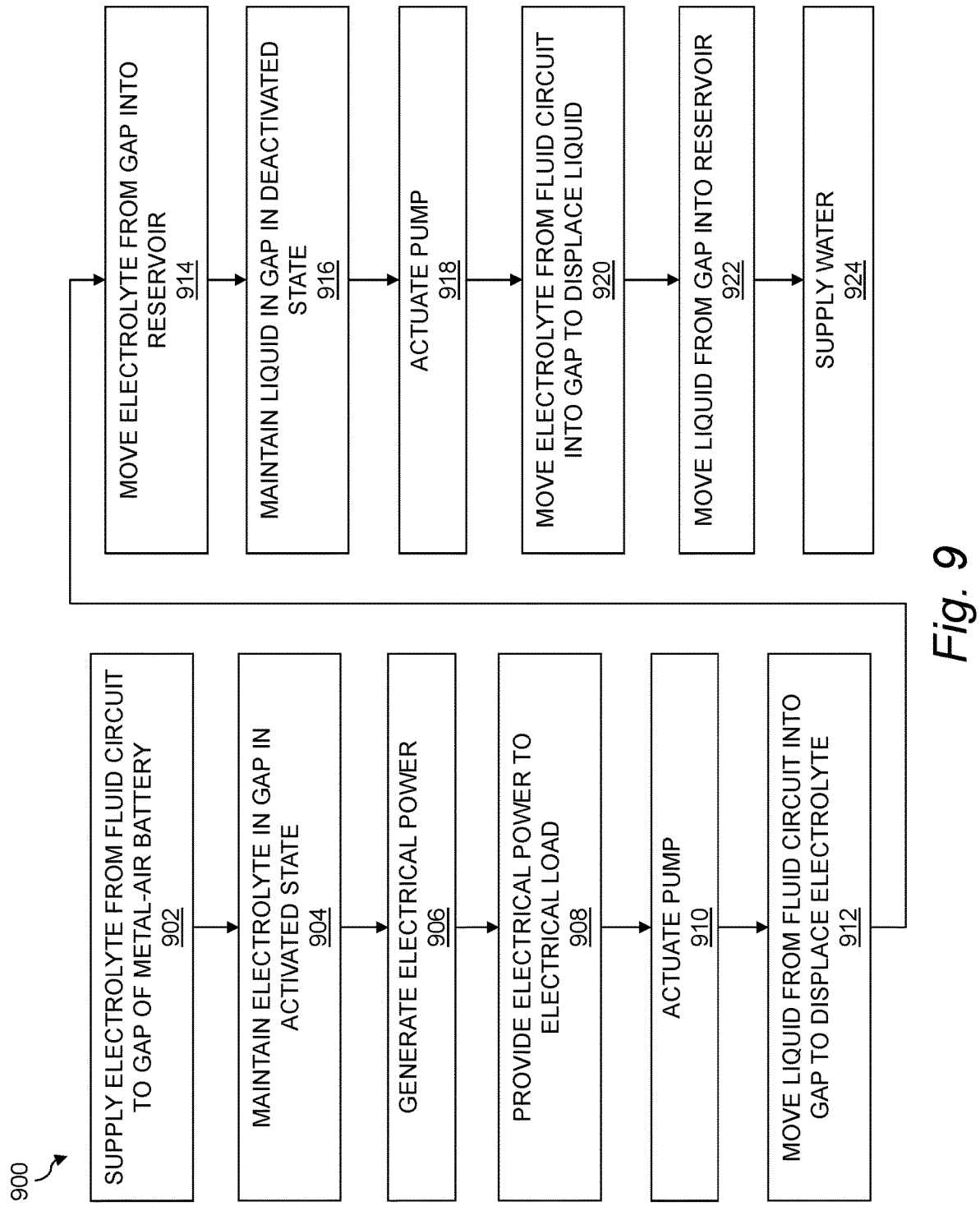
FIG. 9 is a flow chart of an exemplary method of operating a metal-air battery system.

FIG. 9 is a flow chart of a method of operating a metal-air battery. The method 900 may include the operation, use, or implementation of one or more of the metal-air batteries described herein, and one or more of the systems described herein. For example, the method 900 may be used to mitigate corrosion in a metal-air battery.

As shown in step 902, the method 900 may include supplying a flowable form of an electrolyte from a fluid circuit to a gap defined between a metallic anode and an air cathode of a metal-air battery. The flowable form of the electrolyte may include one or more of sodium hydroxide and potassium hydroxide. The flowable form of the electrolyte may also, or instead, include one or more of an aqueous solution of the electrolyte, a gel including the electrolyte, and a powder.

In certain implementations, the metallic anode includes aluminum, e.g., such that the metal-air battery is an aluminum-air battery. It will be understood that other types of batteries may also, or instead, be operated using the method 900. For example, zinc-air batteries (e.g., where the metallic anode includes zinc) and metal-seawater batteries (e.g., where the air cathode is a seawater cathode) may be operated using the method 900.

As shown in step 904, the method 900 may include maintaining the flowable form of the electrolyte in the gap when the metal-air battery is in an activated state. As described herein, maintaining the flowable form of the electrolyte in the gap may enable predetermined reactions to occur between the metallic anode, the air cathode, and the electrolyte, thereby generating an electrical output from the metal-air battery.

As shown in step 906, the method 900 may include, with the flowable form of the electrolyte disposed in the gap between the metallic anode and the air cathode, generating electrical power at the metal-air battery.

As shown in step 908, the method 900 may include providing electrical power generated at the metal-air battery to an electrical load, e.g., a lithium-ion battery, where the metal-air battery charges the lithium-ion battery.

As shown in step 910, the method 900 may include actuating a pump in fluid communication with the fluid circuit and the gap. The pump may be disposed between the gap and a reservoir holding a liquid. The liquid may be one or more of: (i) less reactive with the metallic anode than the flowable form of the electrolyte is with the metallic anode; (ii) substantially immiscible with the flowable form of the electrolyte; and (iii) less conductive than the flowable form of the electrolyte. The liquid may also, or instead, include a different density than the flowable form of the electrolyte at standard operating conditions for the metal-air battery. The liquid may include a liquid oil, e.g., one or more of mineral oil and a silicone oil.

As shown in step 912, the method 900 may include selectively moving the liquid from the fluid circuit into the gap. The movement of the liquid into the gap may displace the flowable form of the electrolyte from the gap to the fluid circuit. Because the liquid may be less reactive with the metallic anode than the flowable form of the electrolyte is with the metallic anode, movement of the liquid into the gap may substantially limit a reactant of a reaction occurring at the metallic anode in the presence of the flowable form of the electrolyte.

As shown in step 914, the method 900 may include moving the displaced flowable form of the electrolyte from the gap into a first reservoir included in the fluid circuit. As discussed herein, the movement of one or more of the electrolyte and the fluid from the gap into a first reservoir may occur because of displacement by the other one of the electrolyte and the fluid within the gap. However, the movement of one or more of the electrolyte and the fluid from the gap into a first reservoir may also, or instead, be assisted, e.g., via one or more pumps.

As shown in step 916, the method 900 may include maintaining the liquid in the gap when the metal-air battery is in a deactivated state. The liquid being maintained in the gap may substantially limit chemical reactions occurring in the gap, thereby preserving battery life and lessening capacity fade of the metal-air battery. This may be because, as stated herein, the liquid may be less reactive with the metallic anode than the electrolyte. Thus, if the electrolyte is substantially displaced by the liquid in the gap of the metal-air battery in a deactivated state, less chemical reactions may be occurring in the gap, thereby preserving the metallic anode and mitigating corrosion.

As shown in step 918, the method 900 may include actuating a pump in fluid communication with the fluid circuit and the gap. The pump may be disposed between the gap and a reservoir holding the flowable form of the electrolyte. For example, as shown in step 914 above, the flowable form of the electrolyte that was displaced from the gap may have been moved into a first reservoir included in the fluid circuit, and the pump may be disposed between the gap and the first reservoir.

As shown in step 920, the method 900 may include selectively moving the flowable form of the electrolyte into the gap, e.g., using the pump as discussed in step 918. Movement of the flowable form of the electrolyte into the gap may displace the liquid from the gap to the fluid circuit.

As shown in step 922, the method 900 may include moving the liquid that is displaced by the flowable form of the electrolyte from the gap to the first reservoir. Thus, when the flowable form of the electrolyte is selectively moved from the first reservoir into the gap, the movement of the flowable form of the electrolyte into the gap may displace the liquid from the gap to the first reservoir.

In certain implementations, at least steps 910-922 of the method 900 may be repeated over the lifespan of a metal-air battery, as the metal-air battery switches between an activated state and a deactivated state. Thus, the method 900 may generally include actuating a pump in fluid communication with the first reservoir and the gap to selectively move one of the liquid and the flowable form of the electrolyte from the first reservoir into the gap to displace the other one of the liquid and the flowable form of the electrolyte in the gap, where the other one of the liquid and the flowable form of the electrolyte received by the first reservoir upon displacement.

As shown in step 924, the method 900 may include supplying water to the fluid circuit such that the flowable form of the electrolyte includes an aqueous solution of the electrolyte. Water may be supplied from a second reservoir in fluid communication with the first reservoir, where the first reservoir includes the flowable form of the electrolyte. This step 924 may be an initial step for activating the metal-air battery. By way of example, before activation, the metal-air battery may be in fluid communication with a first reservoir including both the liquid and the flowable form of the electrolyte. Upon activation of the metal-air battery, water may be supplied into the first reservoir thereby creating (or adding to) an aqueous solution of the electrolyte. The aqueous solution of the electrolyte may then be supplied into the gap of the metal-air battery for generating electrical power through reactions occurring between the metallic anode, the air cathode, and the aqueous solution of the electrolyte. Additionally, or alternatively, supplying water (or another carrier or solution) to the fluid circuit (or the metal-air battery) may occur periodically or as-needed to replenish the flowable form of the electrolyte. Similarly, the method 900 may include supplying more of the liquid to the fluid circuit (or the metal-air battery) to replenish the liquid.

An example of operation of a system such as those described herein may include changing the state of a metal-air battery from an activated state to a deactivated state by pumping liquid (e.g., oil) into the gap of the metal-air battery from one or more locations to displace a flowable form of an electrolyte (e.g., an aqueous solution of electrolyte) from the gap. This process may take about 30 seconds. The metallic anode of the metal-air battery may include imperfections such as pits or indentations, which may collect electrolytes therein, even when the liquid is moved into the gap. These "trapped" electrolytes may cause corrosion of the metallic anode. However, because a majority of the electrolyte may be displaced, corrosion of the metallic anode may occur at a fraction of the rate of other corrosion mitigation techniques.

In certain implementations, techniques described herein do not leave the metallic anode of a metal-air battery completely dry when the metal-air battery is deactivated. Instead, the fluid that substantially displaces the flowable form of an electrolyte (where the fluid may include an oil as described herein) may remain in any interelectrode gaps of the metal-air battery. A potential benefit of techniques described herein is that the added mass and volume to a metal-air battery for the displacing liquid may be minimal compared to other mechanical mitigation techniques. This could result in increases to pack-level gravimetric and volumetric energy densities, even over some Li-ion battery packs. Also, while Li-ion battery packs may have relatively high volumetric energy densities for batteries, Al-air battery packs may have a distinct gravimetric energy density advantage, e.g., where a decreased battery weight in an electric vehicle allows for the use of less battery because less mass is to be moved. Moreover, using a lighter battery may result in a lower cost vehicle, which can improve the overall costs of BEVs. Lower BEV cost and the mitigation or elimination of range anxiety using Al-air range extenders could increase BEV market penetration, which can lower greenhouse gas emissions.

Techniques described herein may be particularly advantageous for metal-air batteries that are turned on and off in relatively short durations of time. For applications where a metal-air battery is switched on and off in relatively short durations of time, an aqueous solution of electrolyte may be preferred over a gel because of clogging issues that can occur.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
a metallic anode;
an air cathode spaced apart from the metallic anode such that the air cathode and the metallic anode define a gap therebetween; and
a fluid circuit in fluid communication with the gap, the fluid circuit including a flowable form of an electrolyte and a liquid, wherein the liquid is substantially immiscible with the flowable form of the electrolyte and is substantially nonreactive with the flowable form of the electrolyte, the metallic anode is less reactive with the liquid than with the flowable form of the electrolyte, and the liquid is movable in the fluid circuit to displace the flowable form of the electrolyte in the fluid circuit.

2. The system of claim 1, wherein the fluid circuit includes a pump actuatable to displace one of the liquid and a flowable form of the electrolyte in the gap with the other one of the liquid and the flowable form of the electrolyte from the fluid circuit.

3. The system of claim 1, wherein the fluid circuit and the gap define a substantially closed system as the liquid and the flowable form of the electrolyte are displaced back and forth in the gap.

4. The system of claim 1, further comprising a housing containing the metallic anode and the air cathode, the gap between the metallic anode and the air cathode disposed within the housing.

5. The system of claim 1, wherein the fluid circuit includes a first reservoir that holds one of the liquid and the flowable form of the electrolyte while the other one of the liquid and the flowable form of the electrolyte is disposed in the gap.

6. The system of claim 5, further comprising a second reservoir including a carrier, the second reservoir in fluid communication with the first reservoir such that the carrier is movable from the second reservoir to the first reservoir for mixing with the flowable form of the electrolyte, the mixture of the carrier and the flowable form of the electrolyte having a greater flowability than the flowable form of the electrolyte alone.

7. The system of claim 1, wherein the flowable form of the electrolyte includes an aqueous solution of the electrolyte.

8. The system of claim 1, wherein the liquid is less conductive than the electrolyte.

9. The system of claim 1, wherein the liquid includes an oil.

10. The system of claim 9, wherein the liquid includes one or more of a mineral oil and a silicone oil.

11. The system of any of claim 1, wherein the liquid is inviscid.

12. The system of claim 1, wherein the liquid has a different density than the electrolyte at room temperature.

13. The system of any of claim 1, wherein the metallic anode includes aluminum.

14. The system of any of claim 1, wherein the flowable form of the electrolyte includes crystallized electrolytes.

15. The system of claim 1, wherein the electrolyte includes one or more of sodium hydroxide and potassium hydroxide.

16. The system of any of claim 1, further comprising a lithium-ion battery, wherein the metallic anode, the air cathode, and the electrolyte form a metal-air battery, and wherein the metal-air battery is electrically coupled to the lithium-ion battery for charging the lithium-ion battery using electrical power generated by the metal-air battery.

17. A method of operating a metal-air battery, the method comprising:

supplying a flowable form of an electrolyte from a fluid circuit to a gap defined between a metallic anode and an air cathode of the metal-air battery;

with the flowable form of the electrolyte disposed in the gap between the metallic anode and the air cathode, generating electrical power at the metal-air battery; and selectively moving a liquid from the fluid circuit into the gap, the movement of the liquid into the gap displacing the flowable form of the electrolyte from the gap to the fluid circuit and substantially limiting a reactant of a reaction occurring at the metallic anode in the presence of the flowable form of the electrolyte, wherein the liquid is substantially immiscible with the flowable form of the electrolyte.

* * * * *